(12) United States Patent
Ariza Fontecha (10) Patent No.: US 11,708,287 B2
(45) Date of Patent: Jul. 25, 2023

(54) METHOD FOR TREATMENT OF OIL-BASED SLUDGE USING THERMAL DESORPTION

(71) Applicant: TECECOR S.A.S, Cundinamarca (CO)

(72) Inventor: William Ariza Fontecha, Cundinamarca (CO)

( * ) Notice: Subject to any disclaimer, the term of this patent is extended or adjusted under 35 U.S.C. 154(b) by 100 days.

(21) Appl. No.: 17/125,385

(22) Filed: Dec. 17, 2020

(65) Prior Publication Data

US 2021/0188684 A1    Jun. 24, 2021

(51) Int. Cl.
*C02F 11/13* (2019.01)
*C10G 1/04* (2006.01)
*C02F 11/147* (2019.01)
*C02F 103/36* (2006.01)

(52) U.S. Cl.
CPC ............ *C02F 11/13* (2019.01); *C02F 11/147* (2019.01); *C10G 1/045* (2013.01); *C02F 2103/365* (2013.01); *C10G 2300/1003* (2013.01)

(58) Field of Classification Search
CPC .......... C02F 11/13; C02F 11/10; C02F 11/12; C02F 11/121; C02F 11/122; C02F 11/123; C02F 11/125; C02F 11/126; C02F 11/127; C02F 11/128; C02F 11/147; C02F 11/14; C02F 11/148; C02F 11/18; C02F 11/131; C02F 11/15; C02F 2103/36; C02F 2103/365; C02F 2103/38; C02F 2300/1003; C10G 1/045
See application file for complete search history.

(56) References Cited

U.S. PATENT DOCUMENTS

2015/0368567 A1*  12/2015  Wheeler ............... C10B 57/045
                                                                  201/4
2020/0024527 A1*   1/2020  Tomla ..................... C08L 33/08

* cited by examiner

*Primary Examiner* — Prem C Singh
*Assistant Examiner* — Brandi M Doyle
(74) *Attorney, Agent, or Firm* — Eugenio J. Torres-Oyola; Victor M. Rodriguez-Reyes; Rafael Rodriguez-Muriel (57) ABSTRACT

A method for the treatment of oil-based sludge by thermal desorption, characterized in that it comprises a step of conditioning of the sludge to be treated which includes the conditioning of the oil-based sludge with rice husk in a 1:2 ratio, before entering the TDU, increasing the technical and economic viability and cost relation of the thermal desorption for oil-based sludge treatment, showing better performance, and making possible the treatment of sludge on an industrial scale with effective rates of 28.6 m3/day, oil recovery of 54%, with a volumetric increase of 19%, compared to the original volume, and a fuel consumption adjusted to the historical data of the TDU from the economic point of view, which allows to have a high amount of rice husk, reducing the costs associated with the elimination of this agro-industrial waste.

8 Claims, 6 Drawing Sheets

METHOD FOR TREATMENT OF OIL-BASED SLUDGE USING THERMAL DESORPTION

The present invention is directed to a method for treating oil-based sludge by thermal desorption, characterized in that it comprises a stage for conditioning oil-based sludge in which rice husk is added to form a homogeneous mixture before entering the rotary kiln of the Thermal Desorption Unit (TDU). Specifically, the method of the present invention is an indirect thermal high temperature desorption method, and the steps that constitute said method are:

(a) Conditioning the oil-based sludge by adding rice husk;
(b) Putting the mixture in a rotary kiln that transfers the heat from the combustion of a fossil fuel to the mixture;
(c) Heating the mixture to generate desorption of the water and the organic components from the solid matrix;
(d) Passing the vapors generated in stage (c) through condensers that, through heat exchange, return said vapors to liquid state;
(e) Transporting the liquid to oil and water recovery tanks; and
(f) Transferring the treated solid to a pit.

In an alternative embodiment of the invention, the method for treating oil-based sludge by thermal desorption comprises a stage prior to the addition of the rice husk, comprising initial characterization of the oil-base sludge by a retort process.

The method of the present invention is characterized in that the volumetric increase of the oil-based sludge once the rice husk is added is 5% to 35% of the initial volume of oil-base sludge.

In one embodiment of the invention the ratio of oil-based sludge and rice husk is 1:1 to 1:1.5. Preferably, said ratio of oil-based sludge to rice husk is 1:1 to 1:1.3 and ideally, said ratio of oil-based sludge to rice husk is 1:1.2.

The method of the present invention, where heating that occurs in the stage (c) is carried out at temperatures ranging from 500° C. to 700° C. Additionally, the method of the present invention includes a step of cleaning the oven at the end of the process, which includes a decrease in the temperature between 250° C. and 300° C., followed by a controlled increase in temperatures between 550° C. and 600° C., and of the rotation of the unit to produce the expansion and contraction of the oven body, which will fracture and detach the crusts that form on the oven walls.

The detail of the process that determined that the conditioning prior to desorption thermal oil-based sludge had to be carried out with rice husk is discussed below in Example 1. Likewise, Example 2 discusses a preferred embodiment to put the invention into practice, when the method is applied on an industrial scale. None of the examples presented below constitutes a limitation for the present invention.

EXAMPLE 1—COMPARATIVE EVALUATION OF DIFFERENT TREATMENT METHODS FOR OIL-BASED SLUDGE BY THERMAL DESORPTION

To evaluate the results achieved with the method of the present invention, 13,000 barrels of oil-based drilling sludge from the drilling of oil wells in the foothills of the plains were treated and finally disposed, making use of the high temperature indirect thermal desorption process in which the material to be treated was previously conditioned with different filler materials, such as calcium oxide, sand, native soil and rice husk.

The results obtained related to the processing rate, percentage of oil recovery and volumetric increase with respect to the initial volume of the fluid are shown below. The selection of filler materials or excipients used for the sludge conditioning comprised a prior analysis of some general characteristics, as well as the advantages and disadvantages that it would have on the desorption process.

TABLE 1

Prior analysis of possible advantages and disadvantages of filler materials

| Material | Potential advantages | Potential disadvantages |
|---|---|---|
| Calcium Oxide | Abundant and easy to obtain | Increase in cost per unit and transport |
| | Reduces humidity due to the following chemical reaction: | May generate cake inside oven |
| | | May develop incrustation in oven |
| | | Thin |
| River sand | Ideal particle size for thermal desorption | Increase in cost per unit and transport |
| | Abundant and easy to obtain | High weight |
| | Potential reuse | Humidity |
| Native soil | Appropriate particle size for thermal desorption | High weight |
| | Abundant and easy to obtain | Soil contamination |
| | | Humidity |
| Rice husk | Ideal particle size for thermal desorption | Increase in cost per unit and transport |
| | Abundant and easy to obtain | Potential thermal degradation in operating temperatures |
| | Organic | |
| | Los weight | |
| | Low cost due to being considered an agro-industrial residue | |

Then, the methodology described below was applied to determine what could be the conditioning method for oil-base sludge which allowed to overcome the technical problem raised in the present application. The following steps were performed:

1. Initial characterization of the oil-based sludge by a retort process;

2. Mixtures of oil-based sludge with calcium oxide, river sand, native soil, rice husk in proportions (1:1), (1:1.5) and (1:1.2);

3. Qualitative evaluation of the physical properties of the resulting mixture;

4. Characterization of the resulting mixtures by the retort process;

5. Preparation of pilot mixture for trial on an industrial scale; and

6. Evaluation of variables and performance indicators of the thermal desorption.

The oil-base sludge was initially characterized by triplicate analysis of a composite sample taken from the storage pool in different points and at different depths using a vacuum truck. The sampling methodology used sought to minimize possible variations in the composition, due to sedimentation of the sludge densifiers. The results of the characterization and composition of the base sludge are shown in Table 2.

TABLE 2

Characterization of oil-based sludge by a retort method and sludge balance

| Parameter | Results | | | | |
|---|---|---|---|---|---|
| | Sub-sample 1 | Sub-sample 2 | Sub-sample 3 | Sub-sample 4 | Sub-sample 5 |
| % v/v Oil | 60 | 70 | 54 | 61 | 8.0 |
| % v/v Water | 18 | 14 | 22 | 18 | 4.0 |
| % v/v Solid | 22 | 16 | 24 | 21 | 4.2 |
| Density (ppg) | 12.3 | 11.2 | 11.8 | 11.8 | 0.6 |

The formulation of the mixtures with calcium oxide, sand, native soil and rice husk analyzed corresponds to the percentages shown in Table 3. Based on physical appearance, a qualitative description of the appearance and/or texture of the resulting mixture, in order to discard those mixtures that could represent difficulties for the controlled entry of the material into the oven through the endless screw due to its fluidity. Likewise, the volumetric increase was identified with respect to the original residue due to the contribution of material.

TABLE 3

Oil-based sludge and filler material mixtures

| Material | Mixture | Sludge volume (mL) | Sludge/Deposition ratio | Quality description | Volumetric increase |
|---|---|---|---|---|---|
| Calcium Oxide | 1 | 300 | 1:1 | Fluid | 30% |
| | 2 | | 1:1.5 | Semi-pasty | 45% |
| | 3 | | 1:2 | Pasty | 100% |
| River sand | 4 | | 1:1 | Fluid | 50% |
| | 5 | | 1:1.5 | Semi-pasty | 80% |
| | 6 | | 1:2 | Pasty | 110% |
| Native soil | 7 | | 1:1 | Fluid | 50% |
| | 8 | | 1:1.5 | Fluid | 70% |
| | 9 | | 1:2 | Semi-pasty | 100% |
| Rice husk | 10 | | 1:1 | Semi-pasty | 10% |
| | 11 | | 1:1.5 | Pasty | 25% |
| | 12 | | 1:2 | Pasty | 35% |

Figure 1:
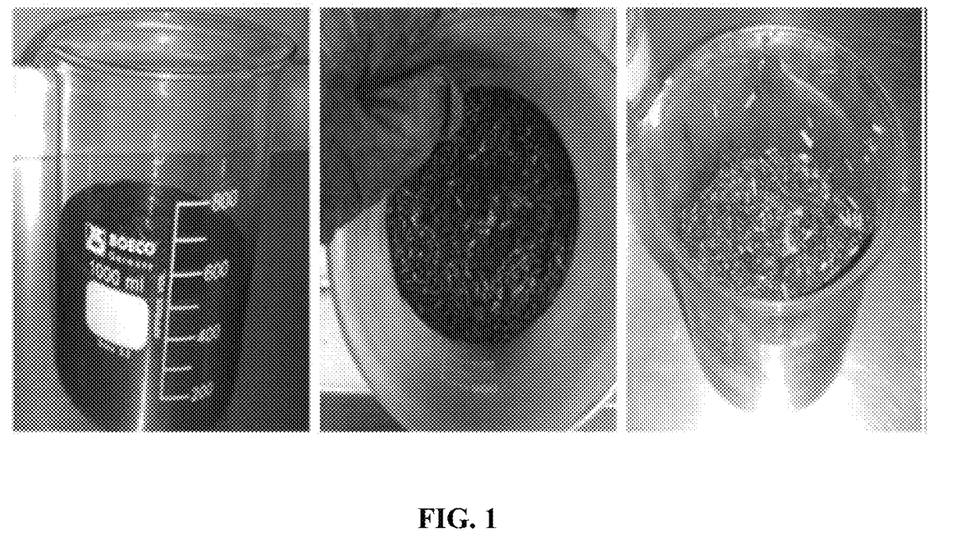
FIG. 1: Comparison of physical appearance between original residue and residue mixed with rice husk.

Of the mixtures indicated in Table 3, three were selected that gave results qualitatively appropriate to carry out thermal desorption according to the principles of the process (Mix 2, 11 and 12). However, the volumetric increase acceptable was determined at a maximum 35% to have economic feasibility, limiting the possible options to mixtures 11 and 12 of oil-base sludge with rice husk. The comparison between the physical appearance between original residue and residue mixed with rice husk is shown in FIG. 1.

Taking into account the qualitative criteria, mixtures 11 and 12 were characterized by the retort process in order to identify reduction in the composition of liquids in percentage volume/volume due to dilution effect. The results are shown in Table 4.

TABLE 4

Comparative retort analysis of mixtures 11 and 12 with oil-based sludge

| Parameter | Results | | |
|---|---|---|---|
| | Mixture 11 | Mixture 12 | Avg. Oil-based Sludge |
| % v/v Oil | 44 | 40 | 61 |
| % v/v Water | 18 | 20 | 18 |
| % v/v Solid | 38 | 40 | 21 |
| Density (ppg) | 12.1 | 12.3 | 11.8 |

Figure 2:
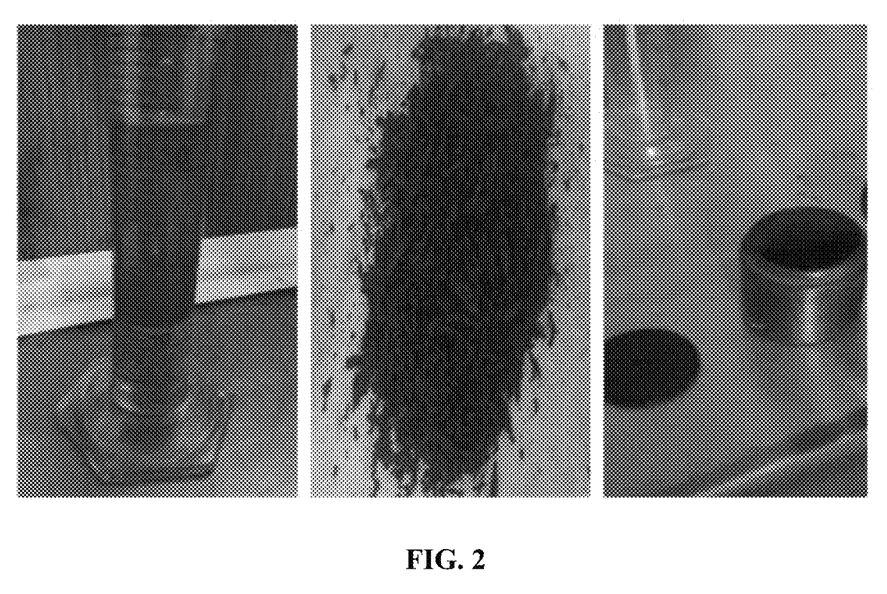
FIG. 2: Phase separation in analysis of sludge mixture with rice husk.

According to the results of Table 4, it was observed that, due to the volumetric increase by the addition of filler material, the concentration of the liquid components of the sludge in the mixtures was reduced. This effect is appropriate for minimizing heat transfer problems due to the design capacity of the condensers and improving the recovery of oil associated with the residue. Also qualitatively evaluated was the behavior of the solid material in the glass of the retort and possible migration to filters, in order to try to predict cake formations in the oven and thin solids that could be washed away with the steam flow to the TDU condensers. Phase separation in analysis of sludge mixture with rice husk are observed in FIG. 2.

After the analysis of the mixtures, no cake formation was observed in the glass, contrary to what happened in the analysis of the sludge with calcium oxide. The rice husk did not suffer thermal degradation and the migration of thin solids towards the filters was not considerable.

EXAMPLE 2—EVALUATION OF THE METHOD OF THE PRESENT INVENTION AT SCALE INDUSTRIAL

Figure 3:
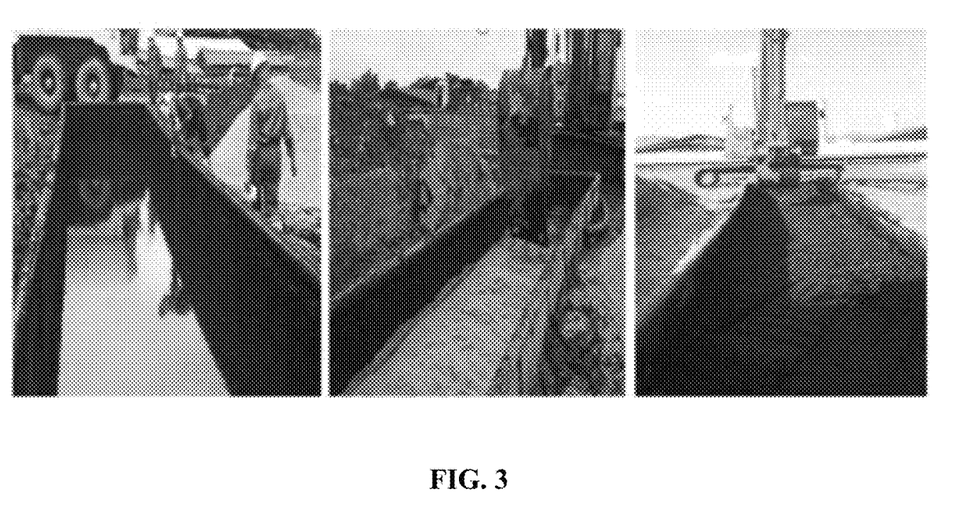
FIG. 3: Preparation of oil-based sludge and rice husk mixture to industrial scale

Using laboratory scale works as a reference, 8 potholes of mixture of oil-based sludge and rice husk in proportions (1:1.5) and (1:2) in the feed catch tanks of the thermal desorption unit, for scaling and evaluation at an industrial level of sludge treatment. Preparation is schematized in FIG. 3.

Industrial-scale tests were carried out for 8 days (24-hour operation), in order to preliminarily determine the average treatment rate of the TDU, volumetric expansion of the residue (Cex. v), as well as the stability in the oven temperatures. During the test days, the appropriate relationship for oil-based sludge and rice husk was set at 1:1.2, resulting in a volumetric expansion coefficient of 1.2 defined according to Equation 1.

$$Cex \cdot v = \frac{\text{Mix Volume (Bbl)}}{\text{Sludge Volume (Bbl)}} \qquad \text{Equation 1}$$

TABLE 5

Data collected during scaling days and TDU testing

| Day | Mixture ratio | Cev | Treatment (sludge m3/day) | Oven temperature range (° C.) | Oven stability | % Initial Hydrocarbons |
|---|---|---|---|---|---|---|
| 1 | 1:1.5 | 1.1 | 24.2 | 461-683 | Unstable | 4 |
| 2 | 1:1.5 | 1.1 | 23.5 | 644-700 | Stable | 2 |
| 3 | 1:1.5 | 1:15 | 25.4 | 487-778 | Unstable | 6 |
| 4 | 1:1.5 | 1.1 | 21.5 | 459-750 | Unstable | 3 |
| 5 | 1:2 | 1.23 | 30.7 | 550-600 | Stable | 1 |
| 6 | 1:2 | 1.19 | 27.8 | 540-610 | Stable | 0 |
| 7 | 1:2 | 1.2 | 29.6 | 545-612 | Stable | <1 |
| 8 | 1:1.5 | 1.21 | 32 | 535-602 | Stable | <1 |

Figure 4:
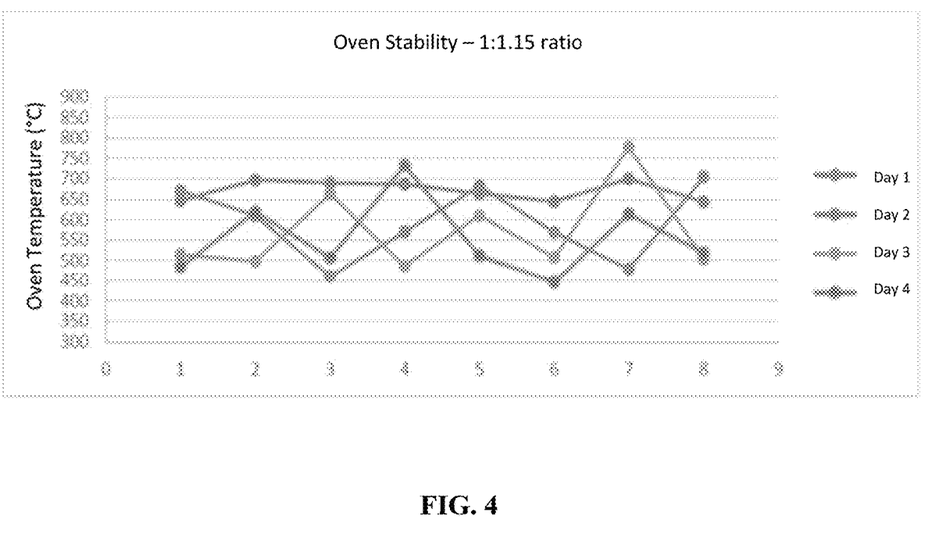
FIG. 4: Stability results in oven temperatures of the TDU for days 1, 2, 3 and 4 of tests.
Figure 5:
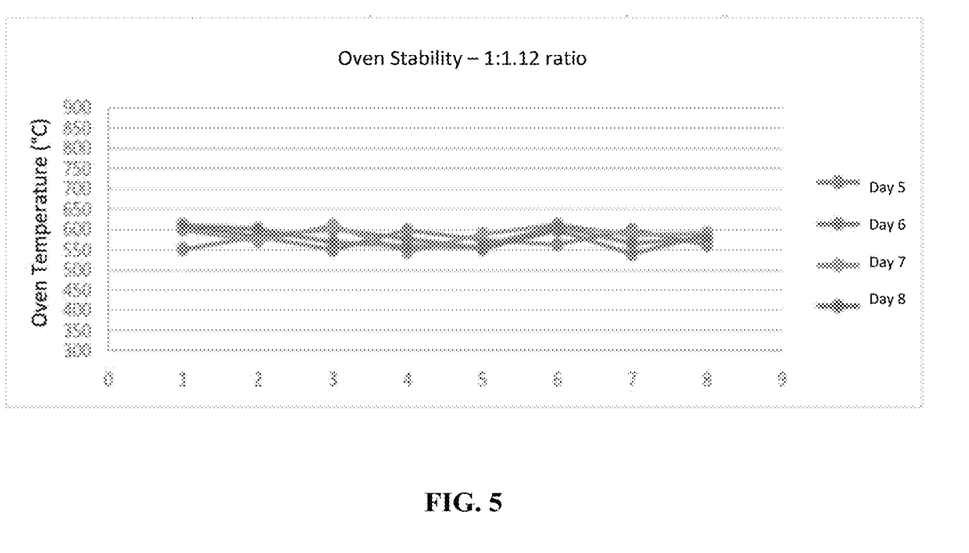
FIG. 5: Stability results in oven temperatures of the TDU for days 5, 6, 7 and 8 of tests.

It was determined that the 1:1.2 mixing ratio between sludge and rice husk allowed to keep the oven of the thermal desorption unit stable with estimated fluctuations of no more than 50° C. (see FIGS. 4 and 5). Under stable conditions, just enough heat energy is supplied to avoid overheating of the vapors generated in the oven and guarantee the complete removal of the contaminant from the solid matrix to levels lower or equal to 1% hydrocarbons. With the mixtures corresponding to the relation 1:1.5, there were difficulties in keeping the feeding rate constant with the endless screw due to the texture of the material.

With the results obtained during the scaling tests, a preparation protocol for oil-based sludge and rice husk mixtures, where the volume of sludge to be deposited in the catch tank was defined, the exact dosage amount of rice husk, the density and the estimated volumetric composition of the resulting mixture to minimize effects on stability and homogeneity of the furnace, thus achieving reproducible results later during the days of operation.

Figure 6:
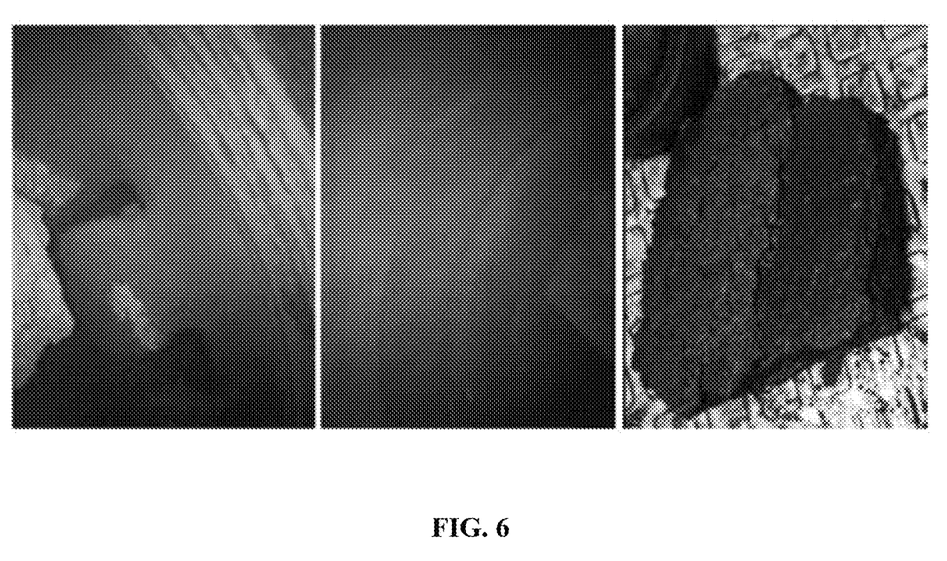
FIG. 6: Photograph of the formation of crusts of refractory material inside from the TDU oven.

A relevant fact that became evident along the way was the formation of rings or refractory material crusts inside the oven after 15 continuous days of operation. An atomic absorption analysis of a sample revealed that the material adhered was constituted mainly by Barium, one of the components of the oil-based sludge. Contrary to what was observed in laboratory-scale tests, where no adherence of the material to the retort cup was evidenced, it was evident in the industrial process. The main unwanted effect of the generation of these crusts or cake in the oven, is the decrease in heat transfer from the combustion chambers towards the material being treated, causing the contaminant not to be eliminated completely from the solid matrix, breaching environmental regulations. The problem was resolved, implementing oven cleaning routines on the fly, through the controlled decrease and increase of temperatures, causing the expansion and contraction of the oven body, in ranges that do not represent metal deformations. As a result, the scabs fractured and ended detaching with the help of unit rotation, restoring efficiency in heat transfer, as evidenced in FIG. 6.

Table 6 presents the data obtained from the thermal desorption process during a typical month of operation, treating oil-base sludge:

| Date | Mixture volume (m3) | Cex · v | Treatment volume (m3) | Initial characterization | | | Oil Balance (m3) | |
|---|---|---|---|---|---|---|---|---|
| | | | | % Oil | % Water | % Solid | Expected | Recovered |
| 1 Oct. 2018 | 31.3 | 1.21 | 25.9 | 53 | 21 | 23 | 13.8 | 11.4 |
| 2 Oct. 2018 | 36.1 | 1.18 | 29.9 | 56 | 20 | 24 | 16.7 | 11.1 |
| 3 Oct. 2018 | 31.2 | 1.2 | 25.8 | 56 | 25 | 19 | 14.3 | 11.1 |
| 4 Oct. 2018 | 31.3 | 1.19 | 25.9 | 57 | 23 | 20 | 14.8 | 4.8 |
| 5 Oct. 2018 | 38.2 | 1.22 | 31.5 | 56 | 23 | 21 | 17.6 | 15.3 |
| 6 Oct. 2018 | 34.8 | 1.23 | 28.8 | 48 | 36 | 16 | 13.8 | 4.8 |
| 7 Oct. 2018 | 34.8 | 1.19 | 28.5 | 44 | 33 | 23 | 12.6 | 0.0 |
| 8 Oct. 2018 | 38.5 | 1.21 | 31.8 | 40 | 45 | 15 | 12.7 | 10.3 |
| 9 Oct. 2018 | 36.4 | 1.2 | 30.1 | 50 | 29 | 21 | 15.1 | 10.3 |
| 10 Oct. 2018 | 27.2 | 1.2 | 22.4 | 40 | 24 | 36 | 8.9 | 0.0 |
| 11 Oct. 2018 | 23.5 | 1.18 | 19.4 | 45 | 26 | 28 | 8.9 | 4.3 |
| 12 Oct. 2018 | 31.0 | 1.22 | 25.6 | 54 | 21 | 25 | 13.8 | 9.1 |
| 13 Oct. 2018 | 30.8 | 1.22 | 25.4 | 50 | 20 | 30 | 12.7 | 4.6 |
| 14 Oct. 2018 | 33.2 | 1.18 | 27.5 | 56 | 20 | 24 | 15.4 | 5.6 |
| 15 Oct. 2018 | 28.5 | 1.17 | 23.5 | 58 | 19 | 23 | 13.7 | 5.6 |
| 20 Oct. 2018 | 6.0 | 1.19 | 4.9 | 53 | 20 | 27 | 2.5 | 0.0 |
| 21 Oct. 2018 | 33.9 | 1.19 | 28.0 | 51.5 | 20 | 28.5 | 14.5 | 5.2 |
| 22 Oct. 2018 | 30.2 | 1.16 | 25.0 | 51 | 26 | 23 | 12.7 | 11.0 |
| 23 Oct. 2018 | 35.8 | 1.17 | 29.6 | 51 | 21 | 28 | 15.1 | 11.3 |
| 24 Oct. 2018 | 33.2 | 1.19 | 27.5 | 49 | 21 | 30 | 13.5 | 11.1 |
| 25 Oct. 2018 | 31.8 | 1.2 | 26.2 | 53 | 21 | 26 | 14.0 | 7.6 |
| 26 Oct. 2018 | 35.8 | 1.21 | 29.6 | 47 | 20 | 33 | 13.8 | 4.9 |
| 27 Oct. 2018 | 32.9 | 1.18 | 27.2 | 53 | 23 | 24 | 14.5 | 8.0 |
| 28 Oct. 2018 | 33.2 | 1.18 | 27.5 | 47 | 28 | 25 | 12.9 | 7.5 |
| 29 Oct. 2018 | 33.9 | 1.2 | 28.0 | 51 | 29 | 20 | 14.3 | 7.3 |
| 30 Oct. 2018 | 34.7 | 1.19 | 28.6 | 49 | 28 | 23 | 14.0 | 6.7 |
| 31 Oct. 2018 | 34.0 | 1.2 | 28.1 | 51 | 27 | 22 | 14.3 | 9.1 |
| TOTALES | 862 | 1.19 | 712 | — | — | — | 361 | 198 |
| | | | | | | % Oil Recovery | | |

In the previous table it is observed that the average volumetric expansion coefficient (Cex. v) was 1.19, that is, 11 percentage points below the limit set (30%) economically to make the thermal desorption treatment viable. Likewise, the oil recovery determined by Equation 2 was 54%, that is, 4 percentage points above the goal (50%).

$$\% \text{ Oil Recovery} = \frac{\text{Recovered Oil Volume (Bbl)}}{\text{Sludge Volume (Bbl)} * \% \text{ Oil in Sludge}} * 100 \quad \text{Equation 2}$$

In light of the results shown, it was concluded that the conditioning of oil-based sludge with rice husk in a ratio of 1:1.2 before entering the TDU provides technical and economic feasibility and acceptable cost-benefit ratio within the project performance indicators, since the mixture with rice husk showed the best performance and made sludge treatment possible on an industrial scale with effective rates of 28.6 m3/day, oil recovery of 54%, volumetric increase of 19% compared to the original volume and a consumption of fuel adjusted to historical TDU consumption from the economic point of view.

DESCRIPTION OF THE FIGURES

For a better understanding of the invention, the following figures are included.

The invention claimed is:

1. A method for treating oil-base drilling sludges by high-temperature indirect thermal desorption, comprising the steps of:
    preconditioning an oil-based drilling sludge by adding rice husk in volumetric ratios of 1:1 to 1:1.2 in a sludge/rice husk ratio;
    entering the preconditioned oil-based drilling sludge in a thermal desorption unit to heat it to temperatures in the range of 500° C. to 700° C. and to achieve a separation of oil and water from a solid matrix;
    condensing oil and water vapors to recover them in a liquid state; and
    collecting treated solids, with a hydrocarbon content less than or equal to 1% v/v.

2. The method of claim 1, wherein the addition of husk as a vegetable fiber in proportions of 1:1 to 1:1.2, modifies the fluidity of the drilling sludge and provides it with a pasty or semi-pasty texture allowing controlled and homogeneous entry to the thermal desorption unit.

3. The method of claim 1, wherein after conditioning the oil-based drilling sludge with the rice husk, the resulting volume of mixture to be treated increases by a maximum of 30% expressed as a coefficient of volumetric expansion (Cev) with respect to the original volume of sludge.

4. The method of claim 1, wherein heating at temperatures from 500° C. to 700° C. is carried out in a rotary kiln equipped with internal chains for indirect heat transfer.

5. The method of claim 4, wherein heating of the rotary kiln is carried out by combustion of liquefied petroleum gas (LPG) with two burners of 5,000,000 BTU/h.

6. The method of claim 1, wherein recovery of oil contained in the drilling sludge is carried out in a direct contact condenser spraying oil at a maximum of 90° C. and a flow between 90 to 100 gal/min.

7. The method of claim 6, wherein oil contained in the drilling sludge and recovered in the condensation stage is diesel or petroleum fuel oil.

8. The method of claim 6, wherein recovery of up to 54% of the volume of oil contained in the drilling sludge after the condensation process is achieved.

* * * * *